(No Model.)
R. A. McCARTY.
STORE SERVICE APPARATUS.
No. 325,427.                    Patented Sept. 1, 1885.
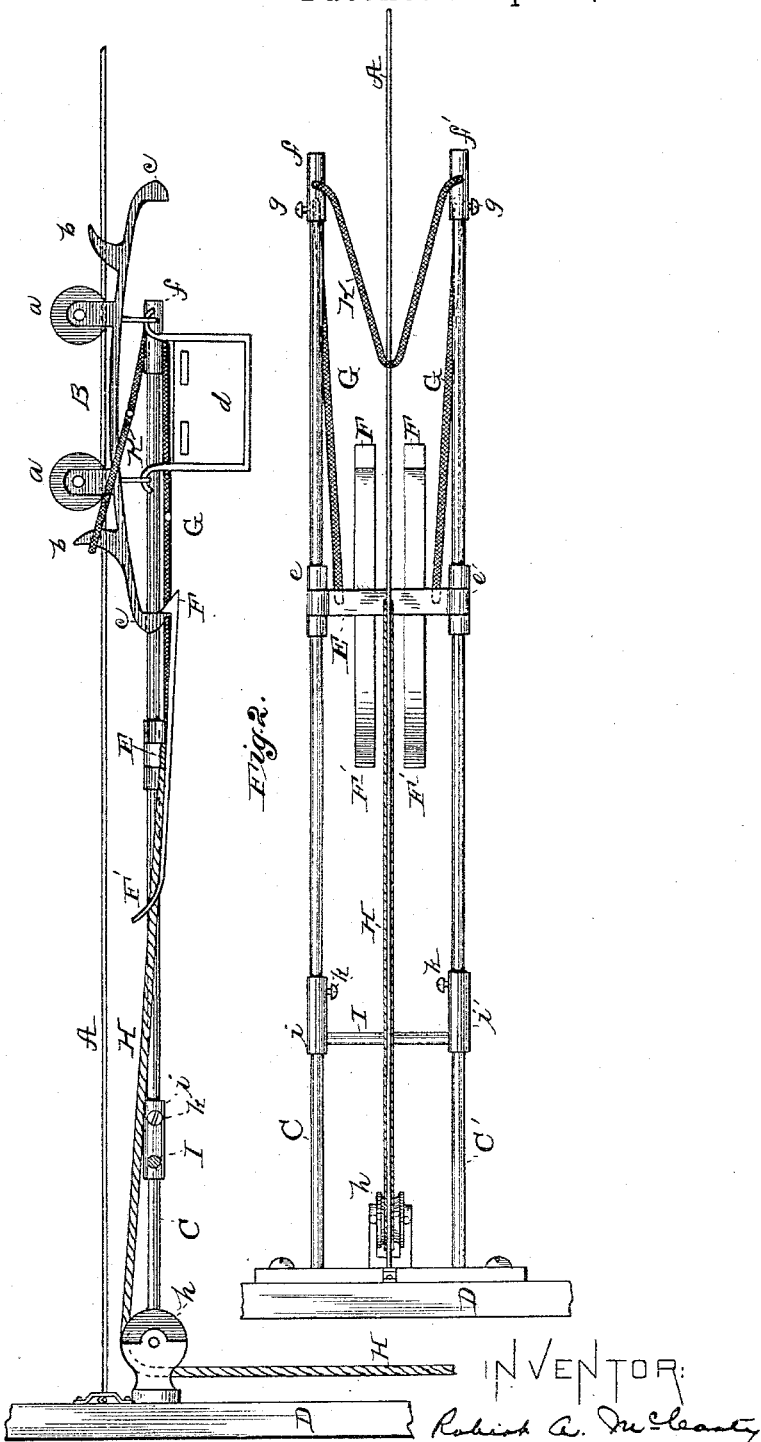
ATTEST:
E. A. Rowland
L. W. Riddle
INVENTOR:
Robert A. McCarty
By Dyer & Seely
Attys

UNITED STATES PATENT OFFICE.

ROBERT A. McCARTY, OF DETROIT, MICHIGAN.

STORE-SERVICE APPARATUS.

SPECIFICATION forming part of Letters Patent No. 325,427, dated September 1, 1885.

Application filed July 25, 1885. (No model.)

*To all whom it may concern:*

Be it known that I, ROBERT A. MCCARTY, of Detroit, in the county of Wayne and State of Michigan, have invented a certain new and useful Improvement in Store-Service Apparatus, of which the following is a specification.

My invention relates to that form of store-service apparatus, original with me, wherein a projecting device is used to give a carrier an initial impetus sufficient to propel it over a way upon which it travels. As described in former applications for patents made by me, the way may be horizontal, and be provided with a projecting device at each end thereof, or it may be inclined, the carrier being driven up the incline by the projecting device and returned by gravity.

The object of my present invention is to produce a simple and effective form of projecting device. The distinctive features of this projecting device are a sliding catch, which draws the carrier back against the tension of a projecting spring, and a tripping or disengaging device, which releases the carrier from the catch and permits it to be projected by the spring. Another spring is used to return the catch to its normal position. The parts are relatively adjustable, so that they can be set to release the carrier when the desired tension is obtained to project the carrier to the other end of the way, and with the desired velocity. This tension will depend upon the length of the way.

In the accompanying drawings, forming a part hereof, Figure 1 is a side elevation of the projecting device, carrier, and way, the nearest side bar of the projecting device being removed; and Fig. 2, a top view of these parts, the carrier being omitted.

A is a stretched wire forming the way back and forth on which the carrier B travels. This wire may be inclined or horizontal, the former arrangement requiring a projecting device at the lower end of the way, and the latter such a device at each end of the way. I prefer to use a horizontal way with a projecting device at each end thereof. The carrier has wheels $a$ riding on wire A, horns $b$ projecting above such wire, and hooks $c$ projecting below the wire. The receptacle $d$, supported by the carrier, is for cash or parcels, or both.

The projecting device is composed of side bars, C C', supported by a wall or other support, D, and projecting beneath wire A, parallel therewith. These side bars may be braced in any desired manner to give them stiffness.

A cross-bar, E, is connected with sleeves $e\ e'$, sliding on bars C C', and this cross-bar carries the catch F and the tripping tail-piece F' of the catch. The catch and tail-piece are shown as divided each into two parts. The two-part catch projects forward of bar E, and the divided tail-piece projects rearward from such bar and turns upwardly at its end, as shown. Springs G connect the bar E with collars $f\ f'$, secured adjustably by set-screws $g$ to the bars C C' at or near their outer ends. A cord, H, is connected with center of bar E, and runs back over a sheave, $h$, at the inner end of projecting device, and then hangs down to within convenient reach of salesman.

Near the inner end of side bars, C C', is the tripping-bar I, which is a cross-bar attached to collars $i\ i'$, secured adjustably to side bars, C C', by set-screws $k$. The tripping-bar I is a rigid bar, while bar E has sufficient spring, so that when the tail-piece strikes bar I bar E will be turned enough to throw down the catch.

Secured to collars $f\ f'$, located at or near ends of side bars, C C', is a loop-spring, K, which rests at its bight on the wire A. This spring K projects the carrier, while springs G simply act to draw the sliding catch forward. These springs are shown as rubber cords; but it is evident they can be metallic springs.

Normally the parts are in position so that the hook or hooks $c$ at end of carrier will engage with catch F, and the horn $b$ at that end of carrier will be in the bight of spring K, as shown in Fig. 1. Now, by drawing down on cord H the catch will be drawn back against tension of springs G, and the carrier will be moved with it against the increasing tension of spring K. This movement will continue until the curved end of tail-piece F' strikes tripping-bar I, when the tail-piece will be thrown upwardly and the catch downwardly, releasing carrier, which is then projected by the force stored up in spring K.

Collars $ff'$ and $ii'$ are made adjustable upon side bars, C C', and by adjusting either or both sets of such collars they can be moved nearer together or farther apart, so that the tension of spring I, when carrier is released, can be varied. Upon the degree of this tension will depend the distance which the carrier can be thrown and its velocity; and since the same projecting devices may be used upon lines of different lengths the adjustment will be made in each case to correspond with the length of line.

What I claim is—

1. In store-service apparatus, the combination, with a way, a carrier traveling thereon, and a projecting spring, of a sliding catch for drawing the carrier back against the tension of such spring, and a trip for releasing the carrier, substantially as set forth.

2. In store-service apparatus, the combination, with a way, a carrier traveling thereon, and a projecting spring, of a sliding catch for drawing the carrier against the tension of such spring, and a trip for releasing the carrier, such parts being relatively adjustable to vary the degree of tension of the projecting spring at which the carrier will be released, substantially as set forth.

3. In store-service apparatus, the combination, with a way, a carrier traveling thereon, and a projecting spring, of a sliding catch for drawing the carrier against the tension of such spring, a trip for releasing the carrier, and a spring for returning the sliding catch to its normal position, substantially as set forth.

4. The combination, with the parallel side bars, C C', of the catch F and tail-piece F', sliding on the side bars, the cord H, tripping-bar I, and springs G K, substantially as set forth.

This specification signed and witnessed this 21st day of July, 1885.

ROBERT A. McCARTY.

Witnesses:
 GEORGE MAITLAND,
 MILTON T. DUNCANSON.